United States Patent
Kim et al.

(10) Patent No.: US 10,112,185 B2
(45) Date of Patent: Oct. 30, 2018

(54) CATALYST AND MANUFACTURING METHOD OF CATALYST

(71) Applicants: Hyundai Motor Company, Seoul (KR); Kia Motors Corporation, Seoul (KR); Postech Academy-Industry Foundation, Gyeongsangbuk-do (KR)

(72) Inventors: Pyung Soon Kim, Gyeonggi-do (KR); Chang Hwan Kim, Gyeonggi-do (KR); Suk Bong Hong, Gyeongsangbuk-do (KR); Taekyung Ryu, Daejeon (KR); Jeong Hwan Lee, Gyeonggi-do (KR); In Sik Nam, Gyeongsangnam-do (KR); Young Jin Kim, Ulsan (KR)

(73) Assignees: HYUNDAI MOTOR COMPANY, Seoul (KR); KIA MOTORS CORPORATION, Seoul (KR); POSTECH ACADEMY-INDUSTRY FOUNDATION, Gyeongsangbuk-do (KR)

( * ) Notice: Subject to any disclaimer, the term of this patent is extended or adjusted under 35 U.S.C. 154(b) by 54 days.

(21) Appl. No.: 15/367,548

(22) Filed: Dec. 2, 2016

(65) Prior Publication Data

US 2017/0333882 A1    Nov. 23, 2017

(30) Foreign Application Priority Data

May 18, 2016 (KR) .......................... 10-2016-0061072

(51) Int. Cl.
| | | |
|---|---|---|
| *B01J 29/06* | (2006.01) | |
| *B01J 29/76* | (2006.01) | |
| *B01J 29/072* | (2006.01) | |
| *B01J 37/30* | (2006.01) | |
| *B01J 37/02* | (2006.01) | |
| *B01J 29/80* | (2006.01) | |
| *B01D 53/94* | (2006.01) | |

(52) U.S. Cl.
CPC .......... *B01J 29/76* (2013.01); *B01D 53/9418* (2013.01); *B01J 29/072* (2013.01); *B01J 29/763* (2013.01); *B01J 29/80* (2013.01); *B01J 37/0201* (2013.01); *B01J 37/30* (2013.01); *B01D 2255/50* (2013.01); *B01D 2257/404* (2013.01); *B01D 2258/012* (2013.01); *B01J 2229/186* (2013.01); *B01J 2229/20* (2013.01)

(58) Field of Classification Search
CPC . B01J 29/76; B01J 29/80; B01J 29/072; B01J 2229/186; B01J 37/0201; B01J 37/30; B01J 29/763; B01D 53/9418; B01D 2255/50
USPC .......................................................... 502/74
See application file for complete search history.

(56) References Cited

U.S. PATENT DOCUMENTS

| 7,922,997 B2* | 4/2011 | Moscoso ................. B01J 29/70 208/136 |
| 7,981,273 B2* | 7/2011 | Nicholas ................. B01J 29/50 208/120.01 |
| 7,982,082 B1* | 7/2011 | Nicholas ................. C07C 2/66 585/467 |
| 2010/0081775 A1 | 4/2010 | Moscoso et al. |
| 2010/0324348 A1 | 12/2010 | Nicholas et al. |
| 2011/0178357 A1 | 7/2011 | Moscoso et al. |
| 2013/0224082 A1 | 8/2013 | Narula et al. |

FOREIGN PATENT DOCUMENTS

| JP | 2008081348 A | 4/2008 |
| JP | 2009-519817 A | 5/2009 |
| JP | 2015-104682 A | 6/2015 |
| KR | 10-2011-0081193 A | 7/2011 |
| KR | 1020140081852 A | 7/2014 |

OTHER PUBLICATIONS

European Patent Office, Munich, Germany, Extended European Search Report of European Patent Application No. EP 16 20 2904.5, dated May 16, 2017, 12 pages.
"Hydrothermal Stability of CuSSZ13 for Reducing N0x by NH3," by Young Jin Kim et al., Journal of Catalysis, vol. 311, Jan. 31, 2014, pp. 447-457, XP028612166, ISSN: 0021-9517, DOI: 10.1016/J.JCAT.2013.12.012.

* cited by examiner

*Primary Examiner* — Elizabeth D Wood
(74) *Attorney, Agent, or Firm* — Brinks Gilson & Lione

(57) ABSTRACT

A catalyst manufacturing method includes: preparing UZM-35 zeolite; manufacturing ion-containing UZM-35 zeolite by substituting ions in a structure of the UZM-35 zeolite; and manufacturing metal-containing UZM-35 zeolite by exchanging copper (Cu) ions or iron (Fe) ions in a structure of the ion-containing UZM-35 zeolite.

17 Claims, 2 Drawing Sheets

CATALYST AND MANUFACTURING METHOD OF CATALYST

CROSS-REFERENCE TO RELATED APPLICATION

Figure 1:
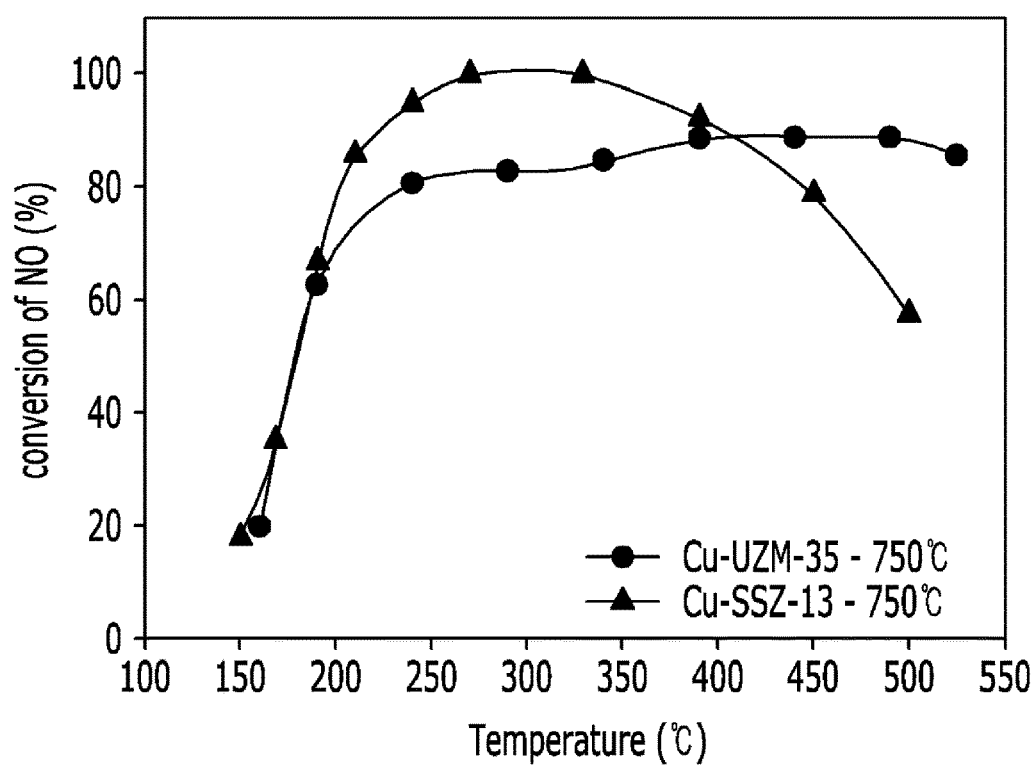

This application claims priority to and the benefit of Korean Patent Application No. 10-2016-0061072 filed on May 18, 2016, the entire content of which is incorporated herein by reference.

FIELD

This disclosure relates to a catalyst and a manufacturing method thereof.

BACKGROUND

In exhaust gas of vehicles, carbon monoxide, hydrocarbons, and nitrogen oxides are included as harmful materials. Among them, nitrogen oxides cause environmental problems such as photochemical smog and acid rain, as well as diseases in humans. Therefore, there is a desire to improve engines and develop a post-treatment technique of exhaust gas.

The most effective technique for removing nitrogen oxides is a selective catalytic reduction (SCR) method. This method has been developed according to a reducing agent such as ammonia ($NH_3$), urea, hydrocarbons (HC), and the like, and various catalysts. Among them, the selective catalytic reduction method that uses ammonia ($NH_3$) as the reducing agent is most effective in removing nitrogen oxides in a fixed source such as a power plant and an incinerator. However, in order to apply it to vehicles that are moving sources, there is a problem of storage, transport, and use of ammonia, so a method for using urea that is capable of being easily decomposed to ammonia by heat decomposition and a hydration reaction as a reducing agent is desired.

Meanwhile, as the catalyst that is applied to the selective catalyst reduction method, zeolite-based catalysts such as copper (Cu)/zeolite having excellent functions may be used. Such catalysts are generally required to maintain their catalyst characteristics even at a high temperature in order to process an exhaust gas having a high temperature.

The above information disclosed in this Background section is only for enhancement of understanding of the present disclosure and therefore it may contain information that does not form part of the prior art that is already known in this field to a person of ordinary skill in the art.

SUMMARY

The present disclosure provides a catalyst and a manufacturing method thereof, having advantages of being capable of maintaining stability even at a high temperature. One form of the catalyst manufacturing method includes: preparing UZM-35 zeolite; manufacturing ion-containing UZM-35 zeolite by substituting ions in a structure of the UZM-35 zeolite; and manufacturing metal-containing UZM-35 zeolite by exchanging copper (Cu) ions or iron (Fe) ions in a structure of the ion-containing UZM-35 zeolite. The manufacturing of the metal-containing UZM-35 zeolite by exchanging the copper (Cu) ions or the iron (Fe) ions in the structure of the ion-containing UZM-35 zeolite may include inserting the ion-containing UZM-35 zeolite into a copper precursor solution or an iron precursor solution and agitating it.

The copper precursor solution may include, without limitation, at least one of copper acetate monohydrate ($Cu(OAc)_2 \cdot H_2O$)), copper nitride, copper nitrate, and copper sulfate.

The catalyst manufacturing method may further include, when desirable, performing a heat treatment on the metal-containing UZM-35 zeolite, after the manufacturing of the metal-containing UZM-35 zeolite. The heat treatment may be performed by heating the metal-containing UZM-35 zeolite to a temperature that is in a range of 400° C. to 700° C. at a temperature-increasing speed that is in a range of 1° C./min to 30° C./min. The heat treatment may be performed for a time period that is in a range of 1 hour to 24 hours.

The catalyst may have a Si/Al molar ratio in a range of about 5 to about 30. When desirable, the copper content of the catalyst may be in a range of about 1 wt. % to about 5 wt. %. Similarly, when desirable, the iron content of the catalyst may be in a range of about 1 wt. % to about 5 wt. %.

According to one aspect of the present disclosure a catalyst is provided that comprises a copper ion-containing UZM-35 zeolite, wherein a Si/Al ratio of the UZM-35 zeolite is in a range of about 5 to about 30. The copper content of the copper ion-containing UZM-35 zeolite may be in a range of about 1 wt. % to about 5 wt. %.

According to another aspect of the present disclosure, the catalyst may further include a copper ion-containing SSZ-13 zeolite. The mixing ratio of the copper ion-containing UZM-35 zeolite and the copper ion-containing SSZ-13 zeolite in the catalyst may be in a range of about 1:9 to about 9:1.

According to another aspect of the present disclosure, a catalyst is provided that includes an iron ion-containing UZM-35 zeolite, wherein a Si/Al ratio of the UZM-35 zeolite is in a range of 5 to 30. The iron content of the iron ion-containing UZM-35 zeolite may be in a range of about 1 wt. % to about 5 wt. %.

According to yet another aspect of the present disclosure, the catalyst may further include an iron ion-containing SSZ-13 zeolite. The mixing ratio of the iron ion-containing UZM-35 zeolite and the iron ion-containing SSZ-13 zeolite in the catalyst may be in a range of about 1:9 to about 9:1.

As such, a catalyst manufactured by a catalyst manufacturing method according to this disclosure can have excellent high temperature stability and can stably remove nitrogen oxides even in an exhaust environment of a high temperature.

Further areas of applicability will become apparent from the disclosure provided herein. It should be understood that the description and specific examples are intended for purposes of illustration only and are not intended to limit the scope of the present disclosure.

DRAWINGS

Figure 2:
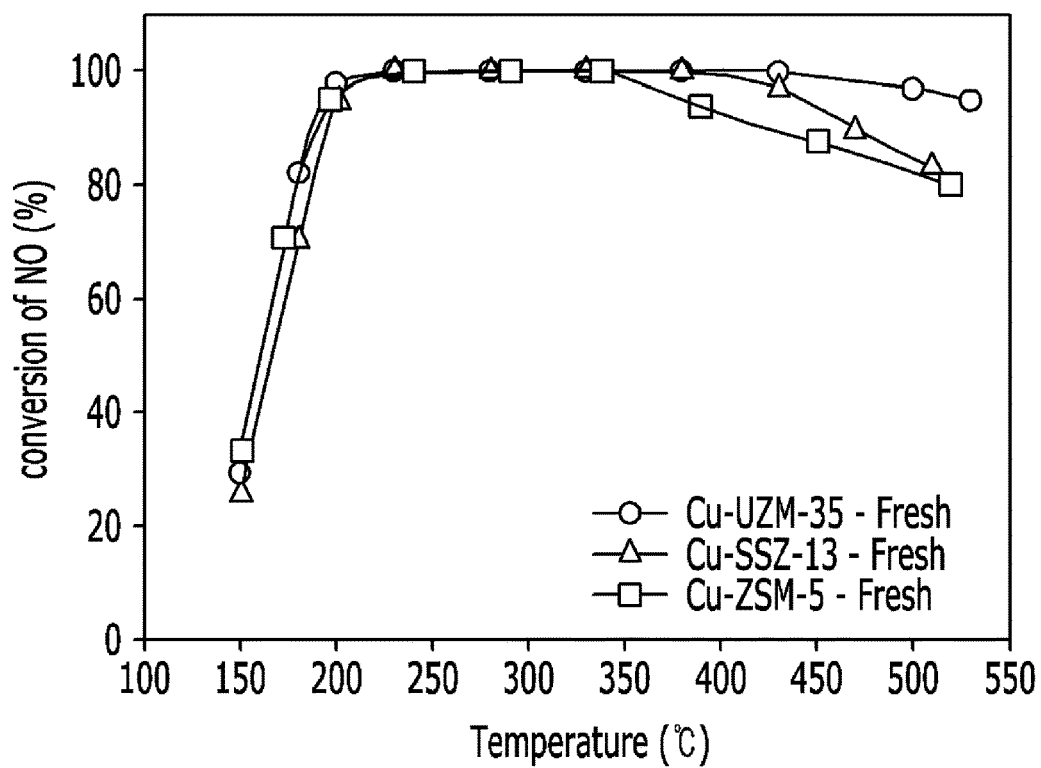

In order that the disclosure may be well understood, there will now be described various forms thereof, given by way of example, reference being made to the accompanying drawings, in which:

FIG. 1 is a graph illustrating conversion performance of nitrogen monoxide depending on temperature for a copper-type UZM-35 zeolite catalyst and a copper-type SSZ-13 zeolite catalyst according to the teachings of the present disclosure; and FIG. 2 is a graph illustrating conversion performance of nitrogen monoxide depending on temperature for a copper-type UZM-35 zeolite catalyst, a copper-type SSZ-13 zeolite catalyst, and a copper-type ZSM-5 catalyst.

DETAILED DESCRIPTION

The following detailed description is merely exemplary in nature, and is not intended to limit the present disclosure, application, or uses. Reference is made in detail to various forms of the present disclosure, examples of which are shown and described, simply by way of illustration. As those skilled in the art would realize, the described various forms may be modified in various different ways, all without departing from the spirit or scope of the present invention.

Hereinafter, a catalyst manufacturing method according to one aspect of the present disclosure is described in detail. The catalyst manufacturing method includes preparing UZM-35 zeolite, manufacturing ion-containing UZM-35 zeolite by substituting ions in a structure of the UZM-35 zeolite, and manufacturing metal-containing UZM-35 zeolite by exchanging copper (Cu) ions or iron (Fe) ions in the ion-containing UZM-35 zeolite.

First, the preparing of the UZM-35 will be described. "UZM-35" is a name of zeolite and is represented by a chemical formula "$M_m^{n+}R_r^{R+}Al(1-x)E_xSi_yO_z$." In the chemical formula, M indicates a combination of positive ions that can be replaced with potassium and sodium, "m" is a molar ratio of M to (Al+E) and ranges from about 0.05 to about 3, R is a positive ion of monovalence-charged dimethyl dipropyl ammonium, "r" is a molar ratio of R to (Al+E) and ranges from about 0.25 to about 2.0, E is one of gallium, iron, boron, and a mixture thereof, "x" is a mole fraction of E and ranges from 0 to about 1.0, "y" is a molar ratio of Si to (Al+E) and ranges from greater than 2 to about 12, and "z" is a molar ratio of O to (Al+E) and is calculated by an equation $z=(m+r+3+4*y)/2$. A structure of the UZM-35 zeolite is disclosed in U.S. Pat. No. 7,922,997, the entire contents of which are incorporated herein by reference.

The preparation of the UZM-35 zeolite may be executed by purchasing UZM-35 zeolite or by synthesis that is performed by any method known to one skilled in the art, including but not limited to using dimethyldipropylammonium hydroxide and the like.

The manufacturing of the ion-containing UZM-35 zeolite may be accomplished by substituting ions in a structure of the UZM-35 zeolite. The manufacturing of the ion-containing UZM-35 zeolite includes inserting UZM-35 zeolite into an ammonium salt solution to make a reaction and drying it. Alternatively, the UZM-35 zeolite is inserted into an ammonium solution to reflux it. In this case, a reflux temperature may be in a range of about 60° C. to 100° C., and a reflux performing time may be in a range of about 5 hours to 7 hours. The NH$_4$-type UZM-35 zeolite containing NH$_4^+$ ion may be subjected to cleaning and drying operations. The ammonium salt may be, without limitation, ammonium nitrate (NH$_4$NO$_3$).

Alternatively, the manufacturing of the metal-containing UZM-35 zeolite may also be accomplished by exchanging copper (Cu) ions or iron (Fe) ions in the ion-containing UZM-35 zeolite. It is possible to manufacture copper-type UZM-35 zeolite containing copper ions through copper (Cu) ion exchange of NH$_4$-type UZM-35 zeolite containing NH$_4^+$ ions. Alternatively, it is possible to manufacture iron-type UZM-35 zeolite containing iron ions through iron (Fe) ion exchange of the NH$_4$-type UZM-35 zeolite containing the NH$_4^+$ ions.

Ion-containing UZM-35 zeolite may be inserted into a copper precursor solution such as copper acetate monohydrate, copper nitride, copper nitrate, or copper sulfate to be agitated, and then cleaning and drying operations are performed in order to perform copper ion exchange. In this case, the agitation may be executed for about 5 hours to about 7 hours. Further, the cleaning operation may be performed by using a filter and distilled water, and the drying operation may be performed at room temperature. The cleaning and drying operations may be repeated 3 or more times. In this step, a copper content of the copper-type UZM-35 zeolite may be in a range of about 1 wt. % to about 5 wt. %.

The catalyst manufacturing method according to the teachings of the present disclosure may further include performing a heat treatment on the metal-containing UZM-35 zeolite after the manufacturing of the metal-containing UZM-35 zeolite by exchanging copper (Cu) ions or iron (Fe) ions in the ion-containing UZM-35 zeolite. The heat treatment may be performed by increasing a temperature of the metal-containing UZM-35 zeolite to a temperature that is in a range of about 400° C. to about 700° C. at a temperature-increasing speed that is in a range of about 1° C./min to 30° C./min. Further, the heat treatment may be performed for a time period that is in a range of about 1 hour to 24 hours. In this case, the heat treatment may be performed by using a burning oven.

The manufacturing method has been described above based on the copper-type UZM-35 zeolite obtained by exchanging copper ions. However, iron-type UZM-35 zeolite obtained by exchanging iron ions may be manufactured by exchanging ions similar to iron ions and using a heat treatment.

A molar ratio of Si/Al may be about 5 to about 30 in a catalyst manufactured by the teachings of the present disclosure. The catalyst manufactured by this manufacturing method has strong high temperature stability and a strong thermal resistance, and may be used even at a high temperature. Accordingly, the catalyst may be used to remove exhaust gas of a vehicle.

Hereinafter, a catalyst according to one aspect of the present disclosure will be described. This catalyst includes UZM-35 zeolite containing copper ions, and a Si/Al molar ratio of the UZM-35 zeolite is about 5 to about 30. When desirable, a copper content of the UZM-35 zeolite containing the copper ions may be in a range of about 1 wt. % to about 5 wt. %. The catalyst of the copper-type UZM-35 zeolite shows excellent catalyst performance at a high temperature due to high temperature stability of the UZM-35 zeolite. The catalyst of the copper-type UZM-35 zeolite according to the present disclosure can maintain its catalyst characteristic even at a high temperature that is equal to or higher than 400° C.

According to another aspect of the present disclosure, the UZM-35 zeolite may include another metal independently or in addition to copper. For example, the UZM-35 zeolite may include at least one of Cu, Fe, Cr, Co, Ni, Mn, Ag, La, Mg, Zn, La, and Ce. A catalyst manufacturing method of UZM-35 zeolite containing another metal is similar to the catalyst manufacturing method of the copper-type UZM-35 zeolite.

A catalyst according to yet another aspect of the present disclosure includes UZM-35 zeolite containing iron ions, and a Si/Al molar ratio of the UZM-35 zeolite is about 5 to about 30. An iron content of the UZM-35 zeolite containing the iron ions is in a range of about 1 wt. % to about 5 wt. %. The catalyst of the iron-type UZM-35 zeolite exhibits excellent catalyst performance at a high temperature due to high temperature stability of the UZM-35 zeolite. The catalyst of the iron-type UZM-35 zeolite can maintain its catalyst characteristic even at a high temperature that is equal to or higher than 400° C. Alternatively, the catalyst may be a mixture of copper-type UZM-35 zeolite and copper-type SSZ-13 zeolite.

The SSZ-13 zeolite is an aluminosilicate zeolite having micropores of 0.38×0.38 nm, and is represented by a formula $Q_xNa_yAl_{2.4}Si_{33.6}O_{72} \cdot zH_2O$, which satisfies ranges of $1.4<x<27$, $0.7<y<4.3$, and $1<z<7$. Q indicates N,N,N-1-trimethyladamantammonium.

The copper-type SSZ-13 zeolite has strong catalyst performance at a low temperature. Accordingly, when the copper-type UZM-35 zeolite and the copper-type SSZ-13 zeolite are mixed to be used, it is possible to maintain excellent catalyst performance in a range of a low temperature to a high temperature.

The copper-type SSZ-13 zeolite may be manufactured by using a method that is similar to the manufacturing method of the copper-type UZM-35 zeolite. The SSZ-13 zeolite may be bought, or manufactured by any method known in the industry that uses a material that is the same or similar to trimethyladamantylammonium hydroxide. In this case, a mixing ratio of the copper-type UZM-35 zeolite and the copper-type SSZ-13 zeolite may be in a range of about 1:9 to about 9:1 in order to obtain optimized catalyst performance.

Further, according to another aspect of the present disclosure, the catalyst may be a mixture of the iron-type UZM-35 zeolite and the iron-type SSZ-13 zeolite. In this case, a mixing ratio of the copper-type UZM-35 zeolite and the copper-type SSZ-13 zeolite may be in a range of about 1:9 to about 9:1 in order to obtain optimized catalyst performance.

In FIG. 1 a graph illustrating conversion performance of nitrogen monoxide depending on temperature for a copper-type UZM-35 zeolite catalyst and a copper-type SSZ-13 zeolite catalyst according to the teachings of the present disclosure. In FIG. 1, each catalyst was aged at a temperature of 750° C. for an experiment. This aging was performed by passing air having a water content of 10% there through and leaving it at a temperature of 750° C. for 24 hours.

Still referring to FIG. 1, the catalyst of the copper-type UZM-35 zeolite generally shows nitrogen monoxide conversion performance of about 80% at a temperature of 250° C. or higher. However, the catalyst of the copper-type SSZ-13 zeolite shows nitrogen monoxide conversion performance of about 80% or more at a temperature that is in a range of about 200° C. to 400° C., but conversion performance thereof is sharply reduced at a temperature of 400° C. or higher. As a result, the catalyst of the copper-type SSZ-13 zeolite shows excellent performance at a temperature of 400° C. or lower, while the catalyst of the copper-type UZM-35 zeolite shows excellent performance at a temperature of 400° C. or higher. Accordingly, when the catalyst of the copper-type SSZ-13 zeolite and the catalyst of the copper-type UZM-35 zeolite are mixed, it is possible to obtain an excellent catalyst characteristic in an entire area of low temperature and high temperature.

The catalyst according to the present disclosure may be used as an SCR catalyst, which reduces harmful materials of an exhaust gas. The SCR catalyst serves to reduce nitrogen oxide included in exhaust gas of an engine by using a selective catalytic reduction (SCR) method. In this case, according to the catalyst and the manufacturing method thereof, it is possible to maintain the catalyst characteristic even at a high temperature without structure collapse. Hereinafter, effects of a catalyst manufacturing method and a catalyst made according to the teachings of the present disclosure will be described through following detailed experimental examples.

Experimental Example 1: A Catalyst Manufacturing Method of Copper-Type UZM-35 Zeolite A 250 ml 2-neck flask was prepared. Two grams of hydrogen-type UZM-35 zeolite and 100 ml of a 1 M ammonium nitrate ($NH_4NO_3$) solution were inserted into the flask, and then it was agitated at a temperature of 80° C. for 6 hours. After the agitation, the UZM-35 zeolite was repeatedly cleaned and dried at room temperature. The cleaning and drying operations were repeated twice. $NH_4$-type UZM-35 zeolite was formed through these operations. Next, the dried $NH_4$-type UZM-35 zeolite was inserted into a 250 ml beaker, and 100 ml of a 0.01 M copper acetate monohydrate ($Cu(OAc)_2 \cdot H_2O$) solution was inserted thereto. Next, the solution was agitated in room temperature for 6 h, and was repeatedly cleaned by using a filter and distilled water and dried at room temperature. The cleaning and drying operations were repeated three times. Copper ions were included in the UZM-35 zeolite, thereby forming copper-type UZM-35 zeolite. Next, the copper-type UZM-35 zeolite was heated to 550° C. at a speed of 2° C./min in a burning oven and was burned for 5 hours.

Experimental Example 2: Catalyst Performance Measurement

Conversion performance of nitrogen monoxide depending on temperature was measured for the catalyst of the copper-type UZM-35 zeolite manufactured by the method of Experimental Example 1 and a catalyst of copper-type SSZ-13 zeolite and a catalyst of copper-type ZSM-5 zeolite, and the results are shown in FIG. 2.

As shown in FIG. 2, the copper-type UZM-35 zeolite catalyst maintains conversion performance of nitrogen monoxide of about 90% or more even at a temperature of 400° C. or higher. However, as shown in FIG. 2, the conversion performance of nitrogen monoxide was sharply reduced at a temperature of 350° C. for the copper-type SSZ-13 zeolite catalyst and the copper-type ZSM-5 zeolite catalyst. This is because SSZ-13 zeolite and ZSM-5 zeolite used as supporters are not stable at a high temperature, and their structures collapse at the high temperature.

However, for the copper-type UZM-35 zeolite catalyst prepared according to the present exemplary embodiment, UZM-35 zeolite is used as a supporter. Since the UZM-35 zeolite has a stable structure at the high temperature without collapsing, it is possible to maintain the catalyst performance at the high temperature of 350° C. Accordingly, when a catalyst is applied to, e.g., an exhaust gas filter of a vehicle, it is possible to stably remove nitrogen oxide even in an exhaust environment of a high temperature.

Although the exemplary embodiments of the present disclosure are described above, the technical ideas of the present disclosure are not limited to the specific embodiments disclosed in the present specification and therefore those skilled in the art understanding the technical ideas of the present disclosure may easily suggest other embodiments by supplementing, changing, deleting, adding, and the like of components within the scope of the same technical ideas, and it is to be noted that these suggested embodiments are included in the scope of the present disclosure.

While this disclosure has been described in connection with what is presently considered to be practical examples, it is to be understood that the disclosure is not limited to the disclosed examples, but, on the contrary, is intended to cover various modifications and equivalent arrangements included within the spirit and scope of the appended claims.

What is claimed is:

1. A catalyst manufacturing method comprising:
    preparing UZM-35 zeolite;
    manufacturing ion-containing UZM-35 zeolite by exchanging ions in the UZM-35 zeolite; and
    manufacturing metal-containing UZM-35 zeolite by exchanging copper (Cu) ions or iron (Fe) ions in the ion-containing UZM-35 zeolite.

2. The catalyst manufacturing method of claim 1, wherein the manufacturing of the metal-containing UZM-35 zeolite by exchanging the copper (Cu) ions or the iron (Fe) ions in the ion-containing UZM-35 zeolite includes inserting the ion-containing UZM-35 zeolite into a copper precursor solution or an iron precursor solution and agitating it.

3. The catalyst manufacturing method of claim 2, wherein the copper precursor solution includes at least one of copper acetate monohydrate ($Cu(OAc)_2 \cdot H_2O$)), copper nitride, copper nitrate, and copper sulfate.

4. The catalyst manufacturing method of claim 1, further comprising: performing a heat treatment on the metal-containing UZM-35 zeolite, after the manufacturing of the metal-containing UZM-35 zeolite.

5. The catalyst manufacturing method of claim 4, wherein the heat treatment is performed by heating the metal-containing UZM-35 zeolite to a temperature that is in a range of 400° C. to 700° C. at a temperature-increasing speed that is in a range of 1° C./min to 30° C./min.

6. The catalyst manufacturing method of claim 5, wherein the heat treatment is performed for a time period that is in a range of about 1 hour to about 24 hours.

7. The catalyst manufacturing method of claim 1, wherein a Si/Al molar ratio of the catalyst is in a range of about 5 to about 30.

8. The catalyst manufacturing method of claim 1, wherein a copper content of the catalyst is in a range of about 1 wt. % to about 5 wt. %.

9. The catalyst manufacturing method of claim 1, wherein an iron content of the catalyst is in a range of about 1 wt. % to about 5 wt. %.

10. A catalyst comprising
    copper ion-exchanged UZM-35 zeolite,
    wherein a Si/Al ratio of the UZM-35 zeolite is in a range of about 5 to about 30.

11. The catalyst of claim 10, wherein a copper content of the copper ion-exchanged UZM-35 zeolite is in a range of about 1 wt. % to about 5 wt. %.

12. The catalyst of claim 10, further comprising copper ion-exchanged SSZ-13 zeolite.

13. The catalyst of claim 12, wherein a mixing ratio of the copper ion-exchanged UZM-35 zeolite and the copper ion-exchanged SSZ-13 zeolite is in a range of about 1:9 to about 9:1.

14. A catalyst comprising
    iron ion-exchanged UZM-35 zeolite,
    wherein a Si/Al ratio of the UZM-35 zeolite is in a range of about 5 to about 30.

15. The catalyst of claim 14, wherein an iron content of the iron ion-exchanged UZM-35 zeolite is in a range of about 1 wt. % to about 5 wt %.

16. The catalyst of claim 14, further comprising iron ion-exchanged SSZ-13 zeolite.

17. The catalyst of claim 16, wherein a mixing ratio of the iron ion-exchanged UZM-35 zeolite and the iron ion-exchanged SSZ-13 zeolite is in a range of about 1:9 to about 9:1.

* * * * *